US005293583A

United States Patent [19]

Chudgar

[11] Patent Number: 5,293,583

[45] Date of Patent: Mar. 8, 1994

[54] PORTABLE VEHICULAR WATER HEATING TANK HAVING INSULATING JACKET PROVIDING WARMING POCKETS FOR FOOD PACKETS

[75] Inventor: Kiran J. Chudgar, Louisville, Ky.

[73] Assignee: K.C. Electronics Corporation, Louisville, Ky.

[21] Appl. No.: 863,246

[22] Filed: Apr. 3, 1992

[51] Int. Cl.[5] .......................... H05B 1/02; B65D 81/18; F24H 1/06; F24H 1/18

[52] U.S. Cl. .................................... 392/444; 206/541; 206/548; 219/202; 219/385; 219/386; 219/472; 219/475; 219/521; 219/535; 392/441

[58] Field of Search ............... 219/385, 386, 387, 521, 219/535, 202, 200, 393, 472, 475; 392/444, 447, 459, 458, 441, 445, 448, 460, 499, 951; 206/548, 541; 126/351, 344

[56] References Cited

U.S. PATENT DOCUMENTS

| | | | |
|---|---|---|---|
| 1,776,890 | 9/1930 | Dart | 206/548 |
| 2,707,721 | 5/1955 | Anderson | 219/386 |
| 2,830,613 | 4/1958 | Mason | 137/353 |
| 2,975,797 | 3/1961 | Matheney | 137/353 |
| 3,231,713 | 1/1966 | Menuto | 137/353 |
| 3,558,013 | 1/1971 | Ponzo et al. | 222/146.2 |
| 3,619,563 | 11/1971 | Hirst | 219/386 |
| 3,842,241 | 10/1974 | Isaacson | 219/535 |
| 4,055,279 | 10/1977 | Lapera et al. | 222/146.2 |
| 4,112,281 | 9/1978 | Epps | 126/361 X |
| 4,140,150 | 2/1979 | Rundell | 222/146.2 |
| 4,480,173 | 10/1984 | Butterfield | 392/401 |
| 4,537,313 | 8/1985 | Workman | 206/545 |
| 4,713,522 | 12/1987 | Kimura | 219/202 |
| 4,889,973 | 12/1989 | Farinacci | 392/444 |

OTHER PUBLICATIONS

"Cooking and Boiling Vessel"-Specification Sheets 25-31-71 Jul. 18, 1985, 6 pages.

"Cooking Vessel", 2 pages.

*Primary Examiner*—Anthony Bartis

*Attorney, Agent, or Firm*—Dowell & Dowell

[57] ABSTRACT

A compact low power water heater and food product warming unit especially designed for military vehicles which includes a sturdy and selectively sealed tank having uninsulated thermally conductive in which water may be heated by conduction by way of a heating element secured exteriorly of the tank. The tank is enclosed by a thermally insulated cover in such a manner that a plurality readily accessible pockets are provided between the cover and tank walls into which a plurality of field ration (MRE) or food packets may be inserted to thereby utilize the hot water in the tank as a source of heat for heating the packets.

22 Claims, 5 Drawing Sheets

Fig. 1
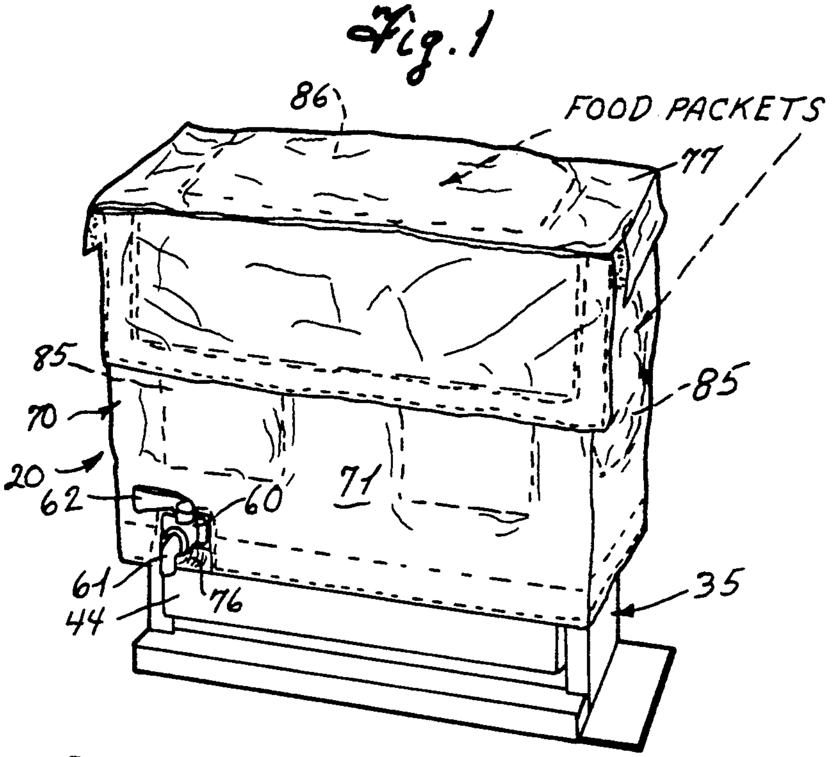
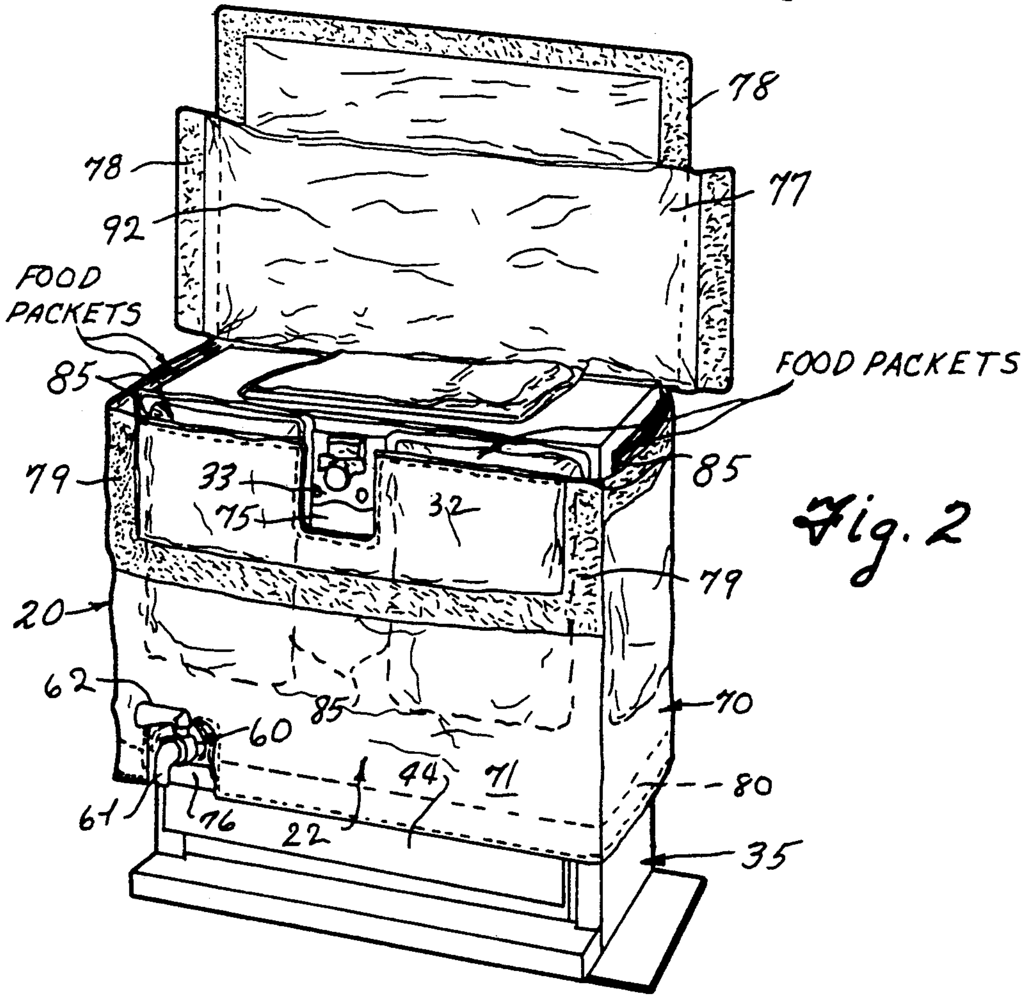
Fig. 2

Fig. 5
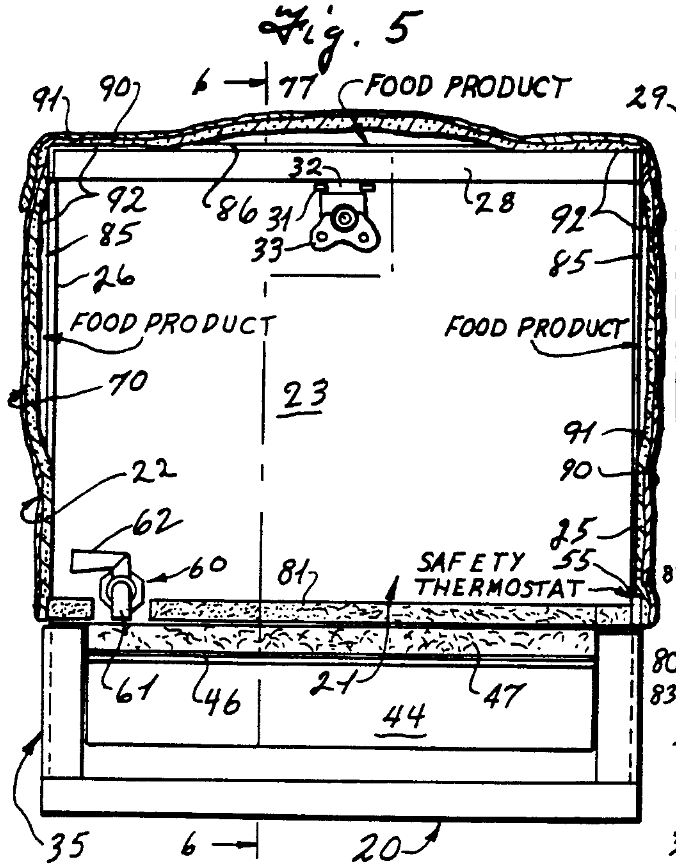
Fig. 6
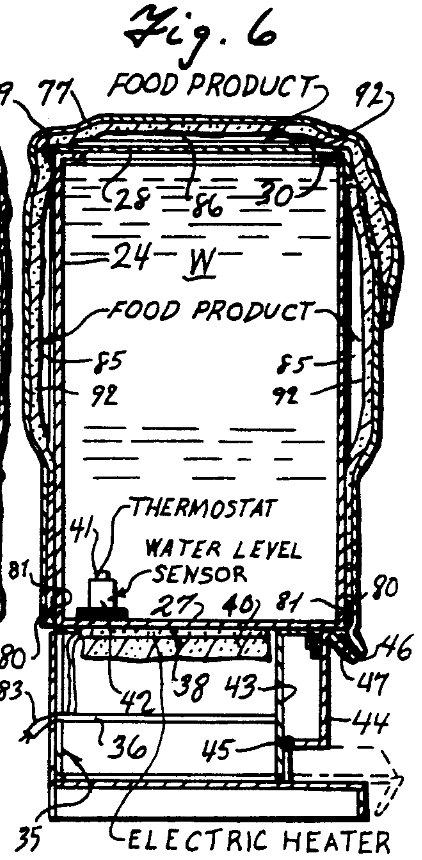
Fig. 7
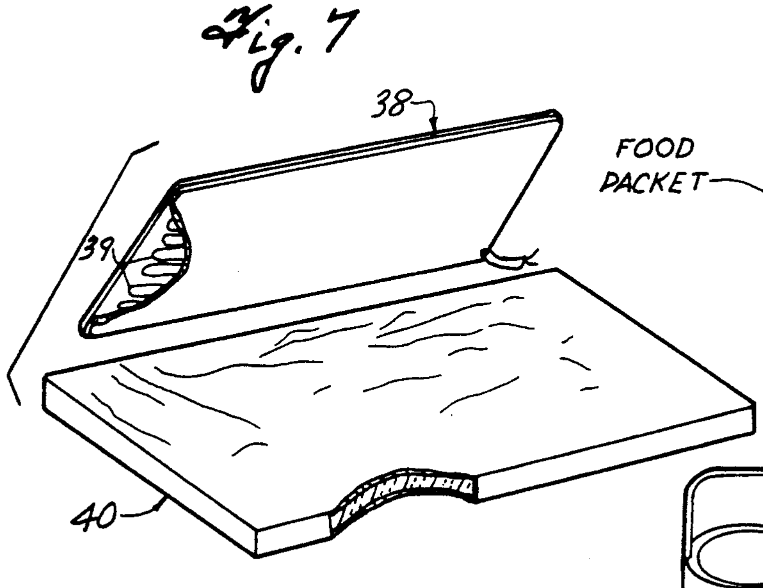
Fig. 9
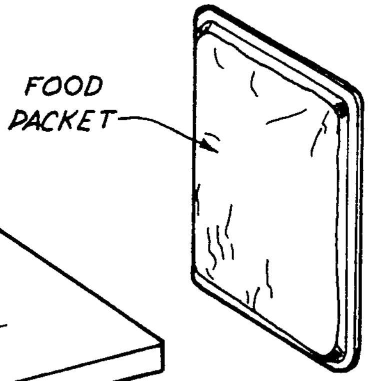
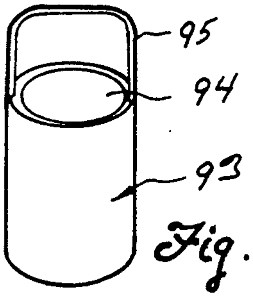
Fig. 8

PORTABLE VEHICULAR WATER HEATING TANK HAVING INSULATING JACKET PROVIDING WARMING POCKETS FOR FOOD PACKETS

BACKGROUND OF THE INVENTION

1. Field of the Invention

This invention is generally directed to water heaters of the type which are designed to be installed in vehicles and more particularly to a combination water heating and food warming unit which may be powered by a source of electrical energy associated with a conventional vehicle. In the preferred embodiment the water heater and food warming unit is specifically designed to be rugged in construction and compact in structure so as to be readily useable within military combat vehicles including tanks, armored personnel carriers, trucks and related vehicles as well as in aircraft including, but not limited to, helicopters and troop transports.

The water heater and ration or food warming unit of the present invention includes a tank in which water is heated by tapping a source of energy supply associated with the vehicle utilizing low amperage heating elements which maintain the water at a temperature at which it may be used for: human consumption such as for making coffee and tea; as a source of hot water for shaving and other health needs; and as an indirect source of energy for heating and supporting field rations or other food packets so that hot food is available to individuals while they are positioned in remote areas.

2. History of the Related Art

The long existing need for an effective means for providing hot water and heated rations for the crewmen of combat vehicles was reemphasized during operations involved by the United States and it's allies during the war against Iraq. In today's high-tech military environment there remains an area of troop support which has not been adequately addressed. Troops in forward or remote positions have not had adequate sources of hot water; either for use for consumption, such as in the making of hot tea or coffee, or for purposes of personal hygiene such as for shaving, washing or medical applications. Further, such troops have also not had readily available sources of hot food while in remote positions.

During operations involved with Desert Storm, forward units such as personnel in armored personnel carriers and tanks were subjected to extremely cold daytime and nighttime temperatures, often below freezing. Due to the mobile nature of such units, the setting up and establishing of food service facilities was not practical. Therefore, if troops sought a source of hot water, for whatever reason, they often resorted to placing containers on the exhaust manifolds or engine blocks of their vehicles. Such a method for obtaining a source of hot water is not only dangerous but it is inefficient and cannot provide the necessary protection to insure proper sterilization of fluids being utilized for consumption. In addition, although troops in the field were provided with food rations, referred to as meal ready eating (MRE) packs, such rations were cold and no adequate source of heating was available.

Of the allies involved with Desert Storm, only the British were provided with water heaters installed in their armored units. Such water heaters, however, were not efficient as they operated at high electrical energy levels and did not provide for the heating of food rations except by mixing of hot water with food packet rations.

Over the years there have been numerous innovations directed to providing sources of hot water in conventional vehicles. U.S. Pat. No. 2,975,797 to Matheney, a water supply means for automotive vehicles is disclosed which incorporates a water heating tank mounted in heat exchange relationship with respect to an automobile engine. The water is heated by the heat from the engine and thereafter dispensed as desired. Unfortunately, with this type of heat exchanger, the only way of providing energy for heating is to run the engine. Running an engine to provide a source of heat is not practical and in many combat situations would be totally impossible. Further, the temperature of the water is not adequately regulated to insure not only the destruction of bacteria necessary for providing a healthy source of hot water but also is not regulated to insure that water temperatures are not too hot to prevent scalding when the water is being dispensed. In this respect, the invention requires a separate mixing tank for mixing cold water with the hot water to insure proper temperatures during dispensing. Such a system, involving several tanks, one of which is mounted in heat exchange relationship with respect to an engine, is clearly not suitable for use in many environments and especially in military environments where compactness and control of the heating unit is of utmost importance. A similar water supply source utilizing heat exchange from an engine is disclosed in U.S. Pat. 4,140,150 to Rundell.

In order to provide more responsive and practical heating units for automotive vehicles, other patents have been granted for innovations dealing with electrically heated water supply devices. Such devices are disclosed in U.S. Pat. No. 2,830,613 to Mason, U.S. Pat. No. 3,619,563 to Hirst, U.S. Pat. No. 4,055,279 to Lapera et al. and U.S. Pat. No. 4,713,522 to Kimura. In each of these patents water heaters are disclosed which are powered by a source of electrical supply in the vehicle. The power is either provided directly from the vehicle battery or from an outlet such as a cigarette lighter socket. In each case, however, the heating and dispensing units are not designed to allow their use within combat vehicles including tanks and armored personnel carriers wherein the units would be exposed to a great deal of physical shock caused by the movement of such vehicles in rough terrain. The patent to Lapera discloses a complex dispensing apparatus which requires the use of a separate pump in order to dispense fluid from the system. Such a unit requires additional energy output for the pump which would not be conducive for use in many environments. Further, none of the liquid dispensers or hot water heaters disclosed in the patents provide any means for simultaneously heating food rations, such as MRE packs, and thus would not satisfy the dual need for supplying both hot water and hot food to individuals in the field.

Other hot water supply systems or food storage systems for automotive vehicles are disclosed U.S. Pat. No. 1,776,890 to Dart, U.S. Pat. No. 3,231,713 to Menuto and U.S. Pat. No. 3,558,013 to Ponzo et al. .

SUMMARY OF THE INVENTION

This invention is directed to a combination water heater and food packet warming unit specifically designed for use in vehicles having a source of electrical supply and, in particular, military vehicles wherein the units include a tank which is selectively sealed by a lid which is mounted thereto and wherein a thermally insulated jacket is provided in surrounding relationship with respect to the tank in such a manner as to provide spaces for retaining food packets, such as MRE packs issued in the military, so that the food packets may be heated simultaneously by conduction from hot water being heated within the tank. In the preferred embodiment of the invention, the tank is heated by a flexible resistance heater which is mounted to the bottom wall of the tank and which is powered through a control assembly which monitors the fluid level within the tank and the temperature of the water within the tank. The control assembly includes a thermostat for activating the heating element to maintain water temperatures within a predetermined range and a liquid level sensor to insure that the heating element is de-energized in the event that the water level drops to a predetermined level. The control assembly also detects the wall temperature of the tank and de-energizes the heating element when the temperature of the tank exceeds a predetermined maximum.

In the preferred embodiment, the tank is generally rectilinear in cross section with the lid closing the opening in the upper portion thereof so that when the lid is open the inside of the tank is exposed for easy cleaning. In addition, a separate dispensing valve is provided through a side wall of the tank so that water may be easily dispensed without having to open the lid for access to the hot water supply.

Also, in the preferred embodiment, the thermally insulated cover includes a body portion which is mounted in surrounding relationship with the side walls of the tank and a top portion which is selectively placed over the lid of the tank when the lid is closed and locked with respect to the side walls. Fastening elements, which are preferably material hook and loop interengaging elements such as VELCRO, are utilized to secure the top portion of the thermal cover to the body portion and to also secure the body portion to the tank. In the preferred embodiment, the unit ON/OFF switch is prevented from being accidently engaged by a protective cover which is pivotally mounted to the tank.

It is a primary object of the present invention to provide a very sturdy, compact and reliable source of hot water which is operated utilizing minimum electrical power and which provides a safe source of hot water for personal consumption or personal hygiene such as washing, shaving and cleansing of wounds, and which may also be utilized as a source of energy for heating prepackaged foods such as MRE packs issued in the military so that troops in the field have both hot water and hot food available.

It is a further object of the present invention to provide a compact, sturdy and efficient water heating unit which also serves to provide a source of energy for heating prepackaged food products wherein the temperature of hot water is regulated to insure that it is sufficient to inhibit the bacteria and wherein the temperature is regulated to reduce the possibility of scalding individuals in the event of an accidental rupture of the heating unit in the event such an accident would occur.

It is yet another object of the present invention to provide a very compact and durable combination water heater and food warmer wherein the unit may be easily and quickly connected to the electrical system of conventional vehicles including military vehicles such as tanks and armored personnel carriers, troop transports and the like, without modification to the power equipment or electrical systems of such vehicles.

It is another object of the present invention to provide a compact, durable and reliable water heater and food warmer for use in vehicles, especially of the military type, which are subject to vibration caused by movement through rough terrain and wherein the heating elements associated with the unit are preferably pliable resistance heaters which are adhered directly to a supply tank in which the water is contained so that accidental destruction of the heating elements caused by equipment vibration is effectively eliminated.

It is yet a other object of the present invention to provide a combination water heater and food warming unit for use in combat vehicles wherein the unit may be designed to be the size and shape of conventional ammunition boxes, such as 50 caliber ammunition boxes, utilized in tanks and other vehicles so that the units may be easily installed within existing ammunition racks provided within such vehicles so that the disruption of existing space within the vehicles is avoided when the heating units are installed.

BRIEF DESCRIPTION OF THE DRAWINGS

FIG. 1 is a front perspective view showing the combination water heater and food packet warming unit of the present invention showing the tank having a thermally insulated cover mounted over the exterior thereof.

FIG. 2 is a perspective illustrational view of the combination unit of FIG. 1 showing the top of the thermally insulated cover raised to expose five food packs (MRE packs) which are retained between the thermal cover and the water heating tank in order that the contents thereof may be heated by conduction through the side walls of the tank.

FIG. 5 is a front elevational view of the unit of FIG. 1 having the cover broken away and shown in cross section along the sides and tops of the unit.

FIG. 6 is a cross-sectional view taken along lines 6-6 of FIG. 5.

FIG. 7 is an assembly view showing the pliable resistance heater of the present invention and the insulation used therewith.

FIG. 8 is a perspective view of a supplemental container which may be placed within the heating tank of the present invention.

FIG. 9 is a perspective view of a food pack or MRE packet which is heated utilizing the unit of the present invention.

DESCRIPTION OF THE PREFERRED EMBODIMENT

With continued reference to the drawings, the water heater and food packet warming unit 20 of the present invention is specifically designed to provide a source of hot water shown at W and for heating prepackaged foods such as MRE military ration packets, shown in FIGS. 2, 5, 6 and 9. The unit comprises two primary components, one being the water heating tank 21, shown in FIG. 4, and the other a thermal insulating cover 22, shown in FIG. 3.

Figure 4:
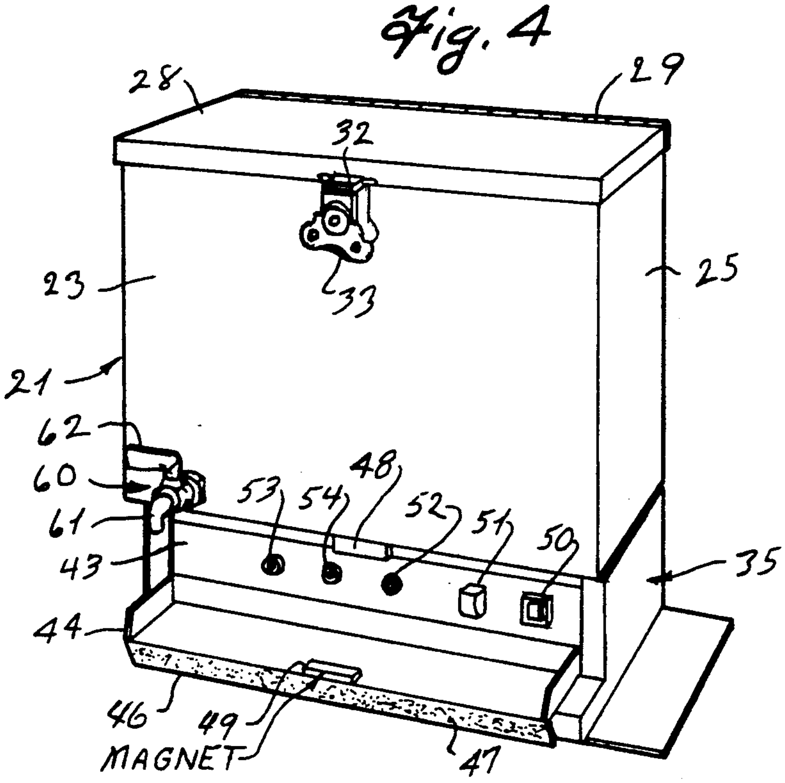
FIG. 4 is a front perspective view of the heating tank of the present invention showing the control panel exposed.

Although the configuration of the water heating tank 21 may be of any desired shape, in the preferred embodiment, the tank is shown as being generally rectangular in cross section and includes a front wall 23, rear wall 24, opposing side walls 25 and 26, and a bottom wall 27. The upper edges of each of the front, rear and opposing side walls define an enlarged opening into the tank which is selectively closed by a rectangular lid 28 which is hinged to the rear wall 24 by a piano hinge 29. The cover is provided interiorly with a rectangular seal 30 which is inset around the periphery thereof and which engages the upper edges of the front, rear and opposing side walls so as to be in fluid tight engagement therewith when the lid is closed relative thereto. In order to secure the lid in a closed position relative to the tank, the lid is provided along its forward center portion with a catch 31 which is selectively engaged by the movable latching mechanism 32 of a rotatable sliding lock 33 mounted to the front wall 33 of the tank. When the locking mechanism 33 is fully latched as shown in FIGS. 4–6, the seal 30 associated with the lid prevents any fluid from escaping the interior of the tank. Due to the enlarged opening into the tank, when the lid 28 is open relative thereto, easy access is available for cleaning the entire chamber defined by the front, rear and side walls of the tank. Ease of cleaning is particularly important to maintain the unit in sanitary working order since the tank will be utilized to heat water for personal consumption. In this respect, in order to further facilitate the cleaning of the tank, the tank is preferably constructed of stainless steel which is not only durable and conducive to easy cleaning but is not subject to the production of rust or other corrosion.

Figure 10:
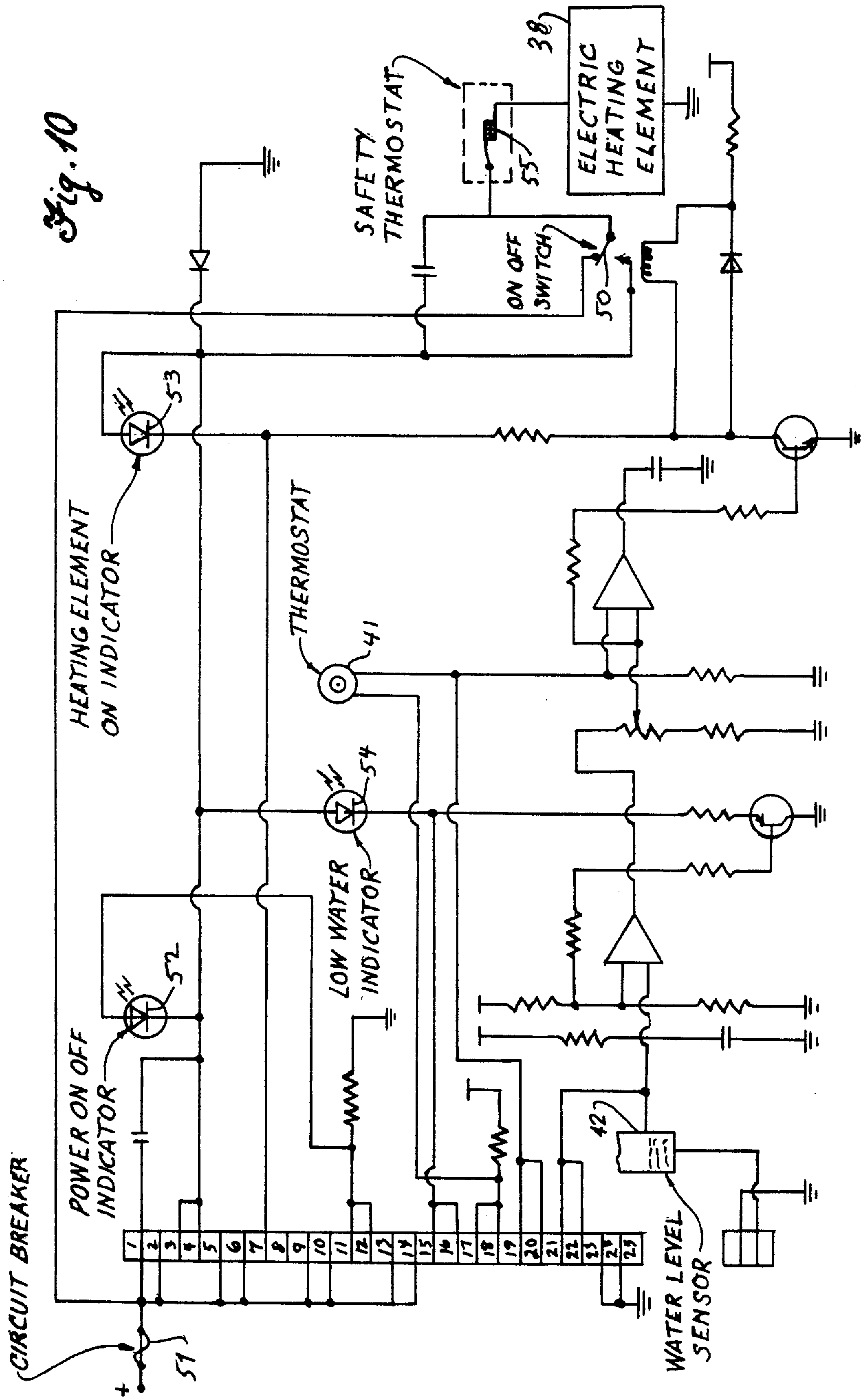
FIG. 10 is an electrical circuit diagram showing a control circuit for the present invention.
Figure 11:
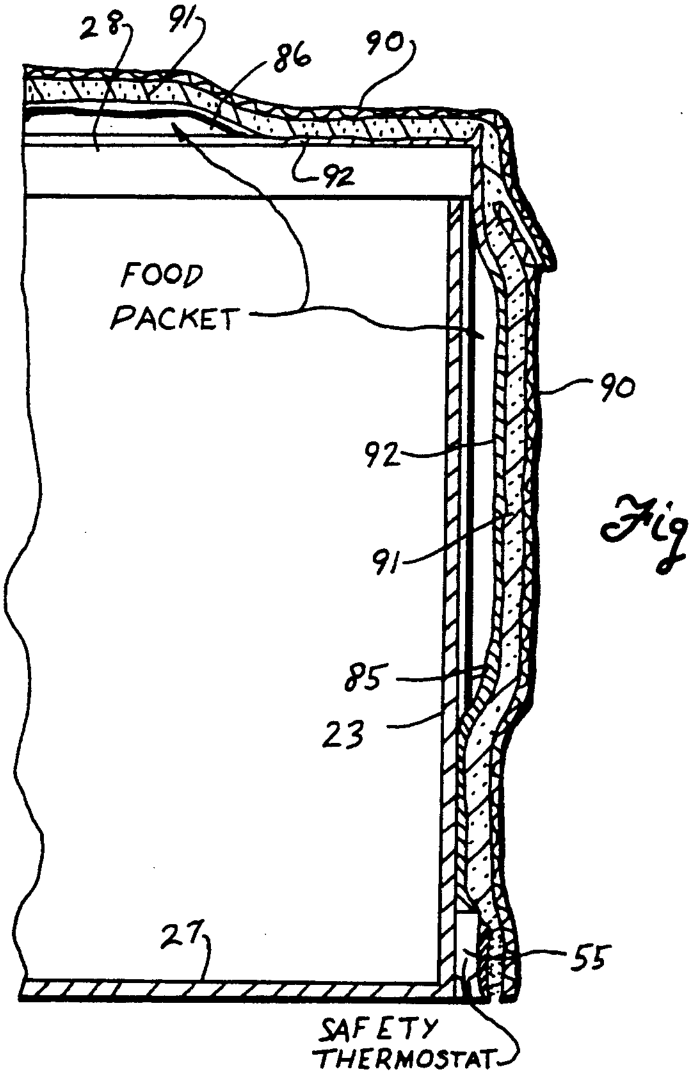
FIG. 11 is an enlarged partial cross-sectional view of the insulating and heat reflecting cover and a portion of the tank shown in FIG. 6.

The tank 21 is fitted on a base portion 35 which houses a circuit panel 36 upon which is mounted the control circuitry 37, as shown in FIG. 10. The control panel 36 is electrically connected to a heating element 38 which, in the preferred embodiment, is a pliable contact surface heater having either fine resistance elements 39 embedded therein or having electrically conductive particles molded integrally therewith so as to provide a resistance heating element. The generally planar flexible heating element 38 is adhesively secured to the exterior of the bottom wall 27 of the tank 21 and preferably extends over approximately 90% of the surface of the lower wall. An insulating member 40 is placed in underlying relationship with respect to the heating element so as to insulate the electrical circuit 37 from the heat generated by the heating element 38. The heating element is designed to operate with a low current drain in order that it may be used in most lighting circuit outlets associated with automotive and military type vehicles. The current draw when initially heating the water within the tank may be between 10–15 amps at 24 to 28 volts and preferrably 10 amps at 24 volts, with the power thereafter being less to maintain the water at a desired temperature. Operating temperatures for the unit are designed to be sufficient enough to inhibit the growth of bacteria after the water has been heated for approximately an hour and a half to two hours. Minimum operating temperatures of 160° F. are therefore required. The unit has also been designed to prevent overheating of the water within the container by controls which will be discussed in greater detail hereinafter. The preferred operating range of the unit is approximately 195°±5° F. By regulating the amperage of the heating element 38, the time in which the water within the tank is heated to its operating temperature may be effectively varied. The unit further includes controls for maintaining the water temperature between the predetermined maximum and minimum by a thermostatic device which will also be described in greater detail hereinafter.

Mounted within the tank 21, are a thermostat 41 and a low water level sensor 42. In the preferred embodiment, these elements are shown as being mounted through lower wall 27 of the heating tank. Both elements are connected to the control circuit 37 carried by the circuit board 36. The front wall 43 of the base 35 defines a control panel. The control panel is selectively enclosed by a protective cover 44 which is pivoted by a hinge 45 adjacent the control panel wall 43. The cover 44 is provided with a downwardly inclined flange 46 extending along the length thereof which serves as a handle for leveraging the protective cover outwardly with respect to the panel. For purposes which will be discussed in greater detail, a loop type material of a hook and loop material fastening system is adhered to the upper surface of the flange 46, as indicated at 47. Magnetic latching elements 48 and 49 are mounted adjacent the wall 43 and along the back of the cover 44 for securing the cover in a closed position, as is shown in FIG. 6.

Mounted through the control panel 43 are an ON/-OFF switch 50, a circuit breaker 51, and three indicator lights 52–54. Indicator light 52 is utilized to indicate when the unit has been turned on by the ON/OFF switch 50. Indicator light 53 is associated with the thermostat 41 and is activated or illuminated whenever the heating element is energized. Indicator light 54 is associated with the low level water sensor 42 and is illuminated when the water level within the tank reaches a predetermined low level thereby giving an indication that additional water should be added to the tank. As shown in FIG. 10, the low level water sensor, thermostat and the indicators are electrically connected to a power source through the circuit breaker 51 so that when the ON/OFF switch is in an ON condition, the power from the battery or other power source to the heating element 38 is interrupted in the event the thermostat detects temperatures above a predetermined maximum or approximately 195°±5° F. or when the water level within the container is detected to be below a minimum level. In this respect, the thermostat 41 and low level water sensor 42 provide safety assurances to prevent any adverse functioning of the unit under conditions which could be dangerous such as overheating of the water within the container or continued heating of the contents at liquid levels below a predetermined minimum. As a further precaution and safety measure, the control system includes a temperature response switch 55 which is connected to be responsive to the temperature of the walls of the tank and is operable to turn the unit OFF when the temperature of the tank exceeds a maximum of 200° F.

once the temperature of the water within the tank has reached the acceptable temperature of approximately 195° F., the indicator light 53 will be extinguished thereby advising personnel that the water supply is available and ready for use. Water is dispensed from the tank by way of a dispensing valve 60, having a nozzle 61 and operating handle 62. The valve 60 is mounted through the front wall 23 of the tank adjacent the lower portion thereof. Different types of dispensing valves may be utilized in keeping with the teachings of the present invention. As shown in FIG. 4, the protective cover 44 may also function as a support tray when pivoted to its open position whereby a container such as a cup may be placed on the cover and beneath the nozzle 61 of the dispensing valve 60 to thereby support the cup as hot water is introduced therein.

As previously mentioned, the unit of the present invention is specifically designed not only to provide a source of hot water for consumption and/or hygiene purposes, but is also designed to provide a source of heat for warming food packets such as military MRE packs. The unit, in this respect, is designed to be utilized with a flexible or pliable outer thermally insulated cover 22 having a body portion 70 which is of a configuration to generally encircle the front, rear and opposing side walls of the tank 21. In the embodiment shown, the body portion includes a front panel 71, rear panel 72 and opposing side panels 73 and 74. Notches are provided as shown at 75 and 76 in the front panel of the cover for allowing access to the locking assembly 33 and the nozzle 60. Extending from the upper portion of the rear panel 72 is a top panel member 77 which is of a size to overlay the lid 28.

As shown in FIGS. 5 and 6, the thermal cover 22 is designed to create a plurality of open pockets 85 intermediate the cover and the side and front walls 25, 26 and 23, respectively, and 86 between the top 76 of the cover and the surface of the lid 28 for purposes of allowing the food packets to be contained therein. As shown in FIG. 2, the packets are inserted within the pockets 85 and 86 so as to be retained in abutting or flush engagement with the walls of the tank so that the packets are heated by conductive heat exchange by energy passing through the walls of the tank. Although not specifically shown in the drawing figures, additional packets could be provided between the rear wall of the tank and the cover, if necessary. The unit is generally designed to heat five food packets simultaneously, as is shown in FIG. 2. At the operating temperature within the tank of 195° F., the food packets can be heated within approximately twenty minutes to approximately 150° F. with the packets being retained at that temperature until the food is ready for consumption.

In order to seal the top 77 of the thermal cover to the body portion, the top is provided with outwardly extending flanges upon which one material of a hook and loop fabric system is attached such as shown at 78. The other material of a hook and loop fastening material 79, such as VELCRO, is applied across the front and side portions of the body of the cover as shown at 79. As the lid is closed, the flanges are secured by interengaging the hook and loop fastening elements 78 and 79.

Figure 3:
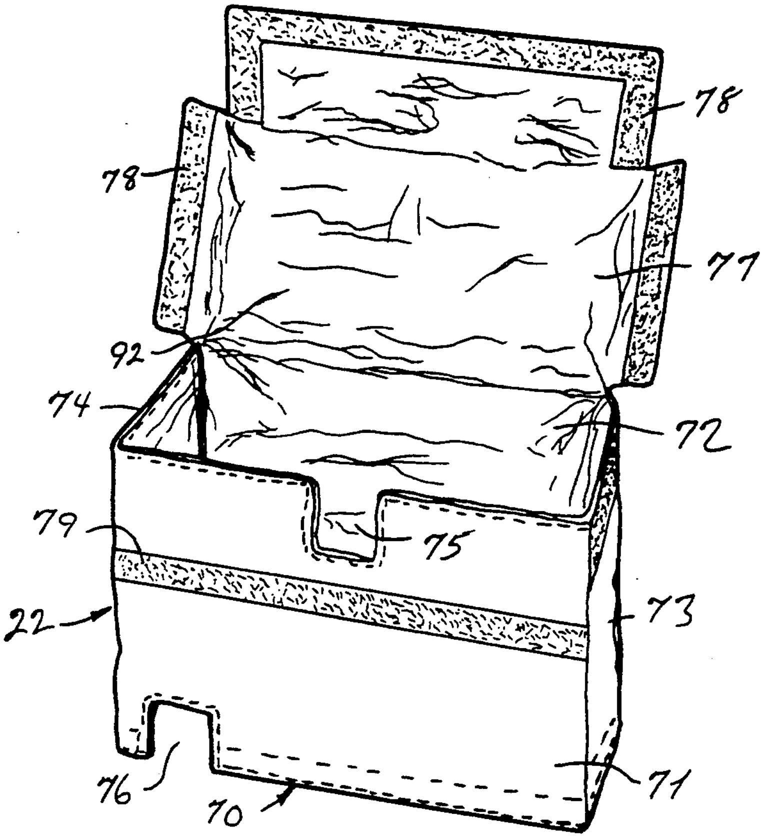
FIG. 3 is a front perspective view of the cover shown in FIGS. 1 and 2 with the top being fully open.

To further secure the body portion 70 of the thermal cover to the tank 21, strips of interengaging hook and loop fastening material are provided along the lower inner edge of the body portion, as shown by dotted line in FIGS. 1-3, at 80 which are interengagable with mating hook and loop fabric materials 81 which are adhesively secured along the side and rear walls of the tank and with the material 47 adhered to the flange 46 of the protective cover 44.

To further increase the efficiency of the unit for heating food, the pliable thermal cover generally includes an outer canvas material 90, an intermediate thermal insulating material 91 and an inner radiant energy reflecting surface 92. Preferably, the inner radiant surface material is an aluminum film.

In operation, when it is desired to utilize the unit, the tank 21 is filled with water and the lid thereafter closed and locked. The thermal cover is thereafter secured about the tank as is shown in FIG. 1 of the drawings. The unit is thereafter connected by a power cord 83 to a source of power supply such as an input jack in a vehicle electrical system. The unit is then activated by turning ON the ON/OFF switch 50. The heating element is thereby activated and will, over a period of approximately one and a half to two hours depending on the amperage rating of the heating element, heat the water to approximately 195° F. When the temperature reaches its maximum operating temperature, the thermostat will deactivate power to the heating element and will allow the temperature to fluctuate several degrees from the predetermined maximum before reactivating the heating element. Generally, the heating is cycled between 2°-5° depending upon the specific requirements of the unit. Therefore, under normal operating conditions, the unit may cycle between 190°-195° F. If for any reason there should be a power surge through the unit, the circuit breaker 51 would be activated. By resetting the circuit breaker normal operation of the unit may be reinstituted. If for any reason the circuit breaker would continue to trip, then the unit should be removed for servicing or replacement.

During operation the indicator light 52 will indicate that the unit has been turned ON. Under normal circumstances the unit should remain ON while water is retained therein. While the water within the tank is being heated, indicator light 53 will be illuminated. In the event the water level in the tank drops below the predetermined minimum water level, the indicator light 54 will be activated, simultaneously activating the circuit for shutting off the heating element and placing the unit in an OFF condition. If the tank temperature exceeds 200° F., the safety cut-off switch will also turn the unit OFF.

Once. the operating temperature has been reached, the top 77 of the thermal cover may be raised and plurality of food packs inserted within the pockets 85 and 86 defined between the thermal cover and the side walls of the unit. Thereafter, the top of the cover is selectively secured to the body portion through the interengaging hook and loop fabric material fasteners and the food packets left for approximately twenty minutes in order to heat them for personal consumption. In some instances a supplemental container 93, such as shown in FIG. 8, may be provided in which food may be placed and the container thereafter sealed by a sealable lid 94. A handle is provided as shown at 95 for lowering and lifting the supplemental container from the interior of the water heating tank. When the supplemental container is being utilized to heat foodstuffs, it is preferred that the water within the tank not be utilized for personal consumption but may be utilized for other purposes such as washing and shaving. After the use of the supplemental container, the water from the tank should be discharged, the tank cleaned and, thereafter fresh water placed within the tank which, after being heated, can be used for personal consumption.

I claim:

1. A combination water heater and food packet warming unit comprising, a tank in which water is selectively retained, said tank having inner and outer wall portions said inner and outer wall portions being uninsulated and made of good heat conducting material, a lid for selectively closing said tank, a heating element mounted in heat exchange relationship with said tank, control means for regulating said heating element so as to heat the water within said tank, a cover means mounted in covering relationship to the exterior surfaces of said tank, said cover means being pliable and including a heat insulating layer, at least one portion of said cover means being spaced outwardly with respect to said outer wall portions of said tank and an access opening into said at least one portion of said cover means, whereby at least one food packet may be selectively received intermediate said at least one portion of said cover means and said tank so that the contents of the food packet are heated by energy being dissipated through said outer wall portions of said tank.

2. The combination heater and warming unit of claim 1 in which said control means includes a thermostat means for sensing the temperature of water within said tank, said thermostat means being operable to energize and de-energize said heating element to maintain the temperature of the water within said tank at a predetermined temperature range.

3. The combination heater and warming unit of claim 2 in which said control means includes a sensor means for monitoring the water level within said tank, said sensor means being operable to de-energize said heating element when the water level is below a predetermined level within said tank.

4. The combination heater and warming unit of claim 3 in which said control means include an ON/OFF switch means for selectively connecting said heating element to a source of power, first indicator means for indicating when said ON/OFF switch means is in an ON condition, second indicator means for indicating when said sensor means has detected a water level below said predetermined level, a third indicator means for indicating when said heating element is energized by said source of power, and a safety switch means for monitoring the temperature of said tank, said safety switch means being operable to terminate power to said heating element when said tank is above a predetermined side wall temperature.

5. The combination heater and warming unit of claim 4 including a protective cover means pivotally mounted to said tank, said protective cover means being pivoted from a first position in which said protective cover means is in covering relationship with respect to said ON/OFF switch means to a second position in which said protective cover means is in a non-covering relationship to said ON/OFF switch means.

6. The combination heater and warming unit of claim 1 including a dispensing valve means mounted to said tank for selectively dispensing water therefrom.

7. The combination heater and warming unit of claim 1 in which said heating element is flexible pad resistance heater secured to said outer wall portions of said tank.

8. The combination heater and warming unit of claim 7 in which said heating element operates in the range of 10–15 amps at 24 volts.

9. The combination heater and warming unit of claim 1 in which said cover means includes a layer of radiation reflecting material arranged to reflect heat inwardly toward said tank.

10. A combination water heater and food packet warming unit comprising, a tank in which water is selectively retained, said tank having inner and outer wall portions, said inner and outer wall portions being uninsulated and made of good heat conducting material, a lid for selectively closing said tank, a heating element mounted in heat exchange relationship with said tank, control means for regulating said heating element so as to heat the water within said tank, a cover means mounted in covering relationship to the exterior surface of said tank, said cover means including a pliable body portion and a pliable top portion, said body portion being mounted in surrounding relationship with respect to said outer wall portions of said tank in such a manner that a plurality of the food packets may be inserted through an access means in said cover means intermediate said body portion and said tank, and said top portion being of a size to selectively cover said lid, whereby the contents of the food packets are heated by energy being dissipated through said outer wall portions of said tank.

11. The combination heater and warming unit of claim 10 including first securing means selectively securing said top portion of said cover means to said body portion and second securing means selectively securing said body portion of said cover means to said tank.

12. The combination heater and warming unit of claim 11 in which said cover means includes a heat insulating material layer and a radiant energy reflecting layer, said radiant energy reflecting layer being arranged to direct heat inwardly toward said tank.

13. A combination water heater and food packet warming unit comprising, a tank in which water is selectively retained, said tank having inner and outer wall portions, said inner and outer wall portions being uninsulated and made of good heat conducting material, a lid for selectively closing said tank, seal means for sealing said lid in fluid tight relationship with respect to said tank, a heating element mounted in heat exchange relationship to said tank, control means for regulating said heating element so as to heat the water within said tank, a pliable thermally insulative cover means, said thermally insulative cover means including a body portion and top portion, said body portion of said cover means being mounted in generally surrounding relationship with respect to said outer wall portions of said tank in such a manner that a plurality of the food packets may be inserted through an access opening in said cover means and retained intermediate said body portion and said tank, said top portion of said cover means being of a size to overlay said lid.

14. The combination heater and warming unit of claim 13 in which said top portion of said cover means is of a size such that at least one food packet may be retained intermediate said lid and said top portion of said cover means whereby said food packets may be selectively heated by energy being dissipated through said outer wall portions of said tank.

15. The combination heater and warming unit of claim 14 in which said tank includes a bottom wall, said heating element being mounted in direct heat exchange relationship with respect to said bottom wall of said tank.

16. The combination heater and warming unit of claim 13 in which said control means includes a thermostat means for regulating the temperature of water within said tank, said control means further including a sensor means for monitoring the water level within said tank, said sensor means being operable to de-energize said heating element when the water level within said tank is below a predetermined level, and said control means further including an ON/OFF switch means for selectively connecting said heating element to a source of power.

17. The combination heater and warming unit of claim 16 including first indicator means for indicating when said ON/OFF switch means is in an ON condition, second indicator means for indicating when said sensor means has detected a water level below said predetermined water level and third indicator means for indicating when said heating element is energized by said source of power and protective cover means for selectively covering said ON/OFF switch means and said first, second and third indicator means.

18. A combination water heater and food packet warming unit for use in mobile vehicles of the type having a source of electrical power supply comprising, a tank in which water is selectively retained, said tank having a bottom wall, front, rear and opposite side walls, said front, rear and side walls being uninsulated and formed of good heat conducting material, a lid for selectively closing said tank, seal means for sealing said lid in fluid tight relationship with respect to said tank, latch means for securing said lid to said tank, a heating element mounted in heat exchange relationship with respect tot said bottom wall of said tank, control means for connecting said heating element to said source of electrical energy and for regulating said heating element so as to heat the water within said tank, a thermally insulated cover means, said cover means including a body portion and a top portion both formed of a pliable material, said body portion being mounted in generally surrounding relationship with respect to said front, rear and side walls of said tank in such a manner that a plurality of the food packets may be inserted through an access means in said cover means and retained intermediate said body portion and said tank, said top of said cover means being of a size to overlay said lid and means securing said top of said cover means to said body portion when said top of said cover means is in overlaying relationship with respect to said lid whereby the food packets are selectively heated by energy being dissipated through the walls of said tank.

19. The combination water heater and warming unit of claim 18 in which said control means includes a thermostat means, a sensor means, and an ON/OFF switch means, said ON/OFF switch means being operable to connect said heating element with the source of electrical energy supply of the vehicle, said thermostat means being operable for sensing the temperature of water within said tank to contact said heating element to maintain an operating temperature within said tank, and said sensor means being operable to de-energize said heating element when the water level within said tank is below a predetermined level.

20. The combination water heater and warming unit of claim 19 in which said heating element is a pliable surface heating pad adhered to said bottom wall of said tank.

21. A combination water heater and food packet warming unit comprising, a tank in which water is selectively retained, said tank having inner and outer wall portions, said inner and outer wall portions being uninsulated and made of good heat conducting material, a lid for selectively closing said tank, a heating element mounted in heat exchange relationship to said tank, control means for regulating said heating element so as to heat the water within said tank, a cover means mounted in covering relationship to said tank, said cover means including a body portion mounted in surrounding relationship with respect to said outer wall portions of said tank, a plurality of pockets defined between said body portion of said cover means and said outer wall portions of said tank, an access opening to each of said pockets through which food packets may be inserted into said pockets so as to be retained intermediate said body portion and said tank, said cover means including a heat insulating material layer and a radiant energy reflecting layer for directing heat inwardly toward the tank, whereby contents of the food packets are heated by energy being dissipated through said outer wall portions of said tank.

22. The combination heater and warming unit of claim 21 in which said heating element is a flexible pad resistance heater secured to said outer wall portions of said tank.

* * * * *